Sept. 30, 1930.  L. C. BRAY  1,777,193
CONVERTIBLE AUTOMOBILE SEAT
Filed May 26, 1928  2 Sheets-Sheet 1
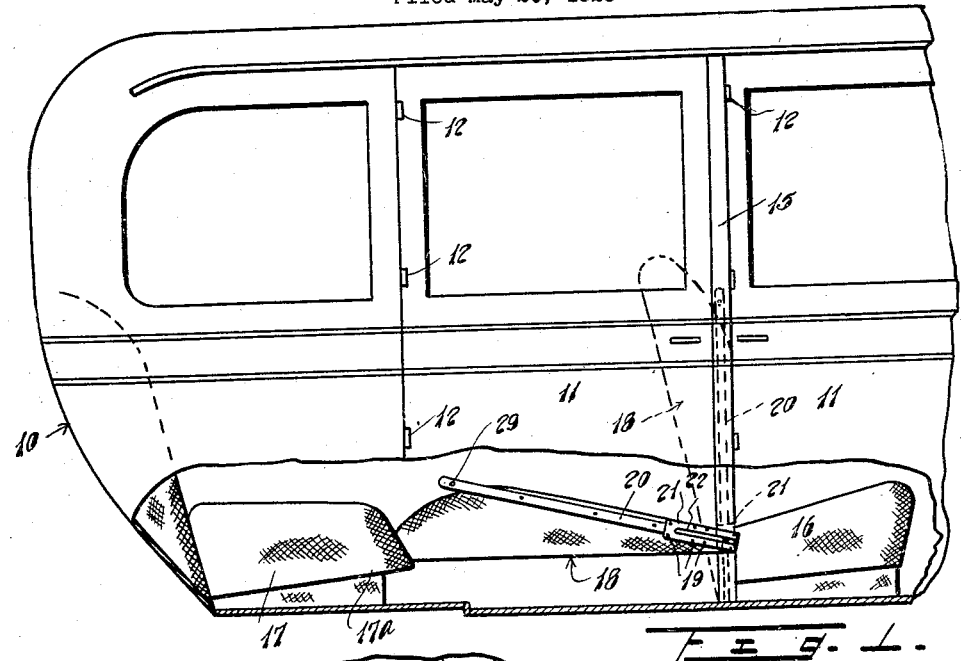
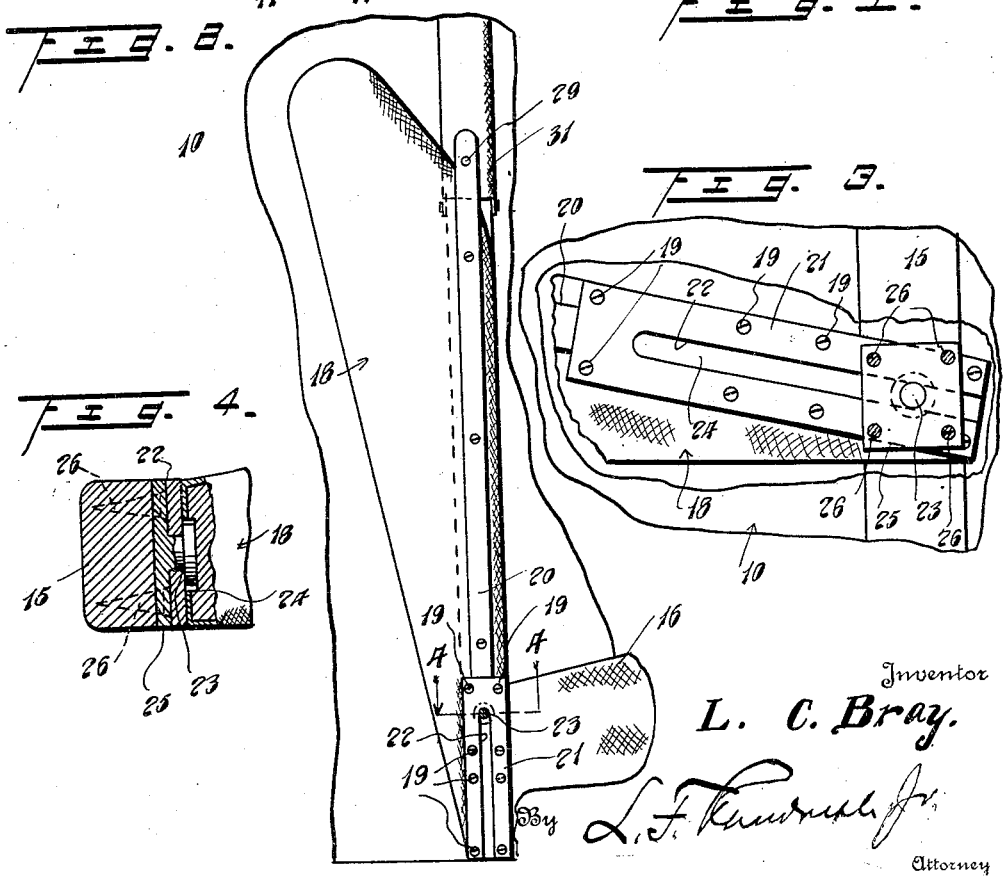
Inventor
L. C. Bray.

Sept. 30, 1930.                L. C. BRAY                1,777,193
                        CONVERTIBLE AUTOMOBILE SEAT
                            Filed May 26, 1928            2 Sheets-Sheet 2
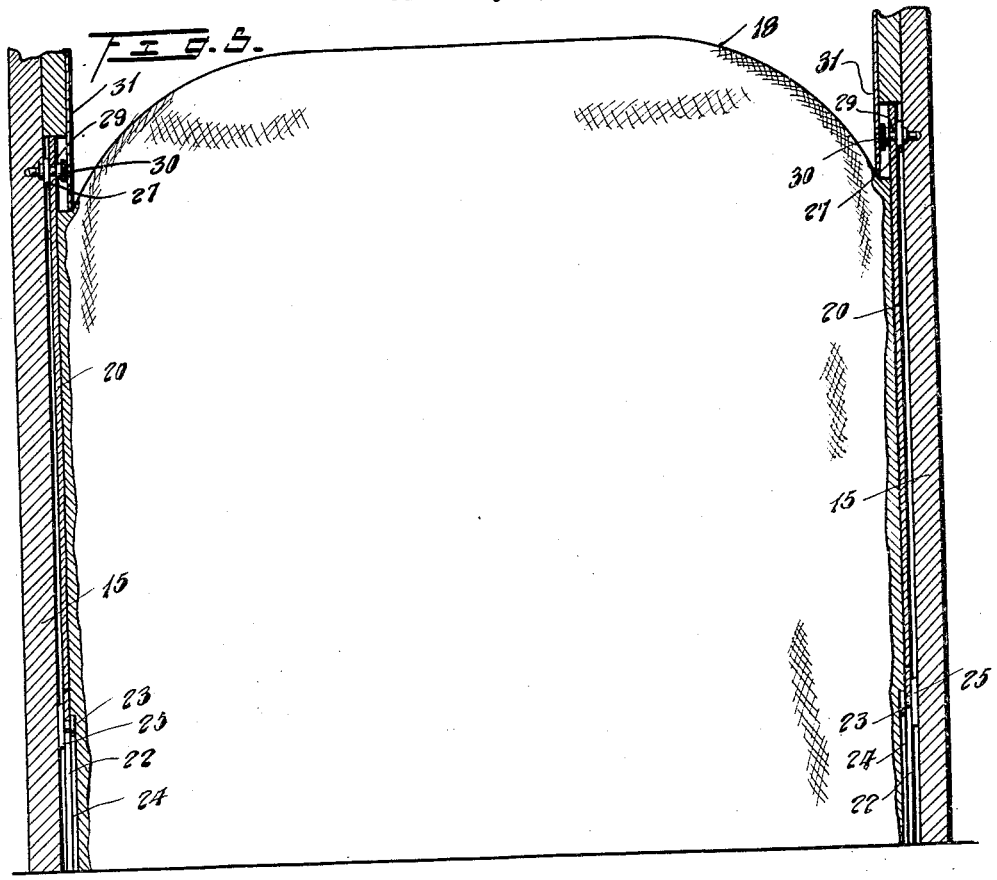
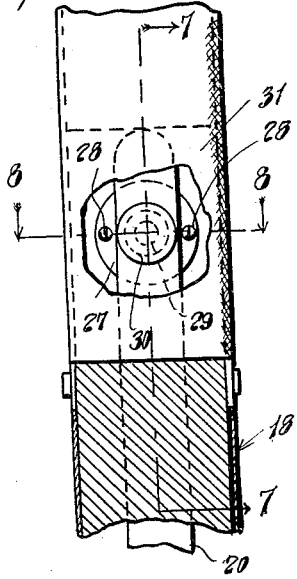
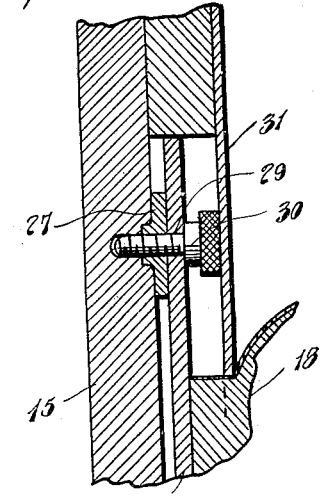
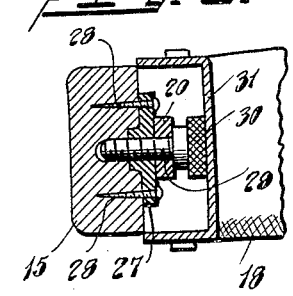
Inventor
L. C. Bray.

Patented Sept. 30, 1930

1,777,193

UNITED STATES PATENT OFFICE

LEE C. BRAY, OF RICHMOND, CALIFORNIA

CONVERTIBLE AUTOMOBILE SEAT

Application filed May 26, 1928. Serial No. 280,836.

This invention relates to an automobile seat structure and particularly to one having a back adapted to perform its usual function and as well be capable of instant conversion in combination with the front seat and rear seat to form a bed.

It is particularly aimed to provide a novel construction wherein the means which mounts the back also permits detachment thereof when desired to facilitate re-upholstering or other repairing.

Still further it is aimed to provide a novel construction utilizing bars adapted to be attached to the back and at one end have pivotal and slidable connection and at the other end be adapted for releasable fastening against lowering movement.

The more specific objects and advantages will be pointed out hereinafter or become apparent from a consideration of the description following taken in connection with accompanying drawings illustrating an operative embodiment.

In said drawings:—

Figure 1 is a fragmentary view partly in side elevation and partly broken away illustrating my improvements applied to a automobile of the closed type;

Figure 2 is an enlarged fragmentary view showing a seat in end elevation in connection with one of the improved bars;

Figure 3 is an enlarged detail elevation of the bar and its connection shown in the same position as in full lines in Figure 1;

Figure 4 is an enlarged detail cross sectional view taken through the parts on the line 4—4 of Figure 2;

Figure 5 is an enlarged transverse sectional view through the automobile showing the mounting of the bars which are carried by the back;

Figure 6 is an enlarged front elevation showing the releasable fastening of one of the bars and associated parts;

Figure 7 is a sectional view taken on the line 7—7 of Figure 6, and

Figure 8 is a sectional view taken on the line 8—8 of Figure 6.

Referring specifically to the drawings, 10 represents a conventional automobile body, the particular type shown being closed and a sedan inasmuch as it has at each side thereof, doors 11 adapted to swing on hinges 12 and be fastened to upright posts 15 disposed between them. As usual, the automobile is equipped with a front seat cushion 16 and a rear seat cushion 17.

Associated with the front seat cushion 16 is a back 18 normally adapted to assume an upright position as shown in dotted lines in Figure 1 and in full lines in Figure 2. The back may be of any desired construction but is of the usual upholstered type.

Fastened against opposite sides of the back 18 by riveting as at 19 or otherwise, are similar metallic strips or bars 20 made in a single piece or composite as preferred. The lower portions of the bars are preferably widened as at 21 and provided with elongated slots 22, which are open at the bottom of the bars.

Said elongated slots 22 receive button shaped pivot elements 23 whose heads are accommodated in grooves 24 provided in the ends of the back 18. Such button shaped pivot elements 23 are integral with or extend from attaching plates 25 which are screwed or otherwise fastened as at 26 to the door posts 15. As a result of this construction, the strips or bars 20 and accordingly the back 18, is both slidably and pivotally mounted.

A nut plate 27 is fastened by screws or the like as at 28, one to each post 15 adjacent the top of the back 18. Adjacent the upper end of each bar 20, it is provided with an opening 29 through which a screw 30 is readily passed so as to screw into or out of the nut plate 27. By reason of the provision of the screws 30, the back 18 is releasably fastened in an upright position. The bolts 30 are usually concealed from view since they are overlapped by adjacent portions 31 of the fabric, leather or other trimming used on the interior of the automobile, and which material 31 is readily displaceable to permit the application and removal of the screws 30.

The rear seat cushion 17, as is usual in automobiles, when in its correct position, has its front edge substantially flush with the support for that seat as shown at 17ª. In accordance with my invention, the seat cushion 17 is adapted to be reversed when the seat is converted, so that the normally rear edge will, as shown in Figure 1, be the front edge and project forwardly beyond the seat support 17ª. The fastenings 30 upon them being removed, permit the seat to be moved slightly vertically and at the same time lowered, swinging on the axes of the pivots 23 so as to occupy the full line position shown in Figure 1 where the front portion of the seat is supported by the pivot members 23 and the rear or normally upper portion of the back is supported by the forwardly projecting portion of the rear seat 17 as shown in said Figure 1. Thus the back of the front seat is brought into substantially flush relation with the seat cushions 16 and 17 and the three elements 16, 17 and 18 constitute a bed or reposing structure.

Attention is also directed to the fact that the back is not only pivotally and slidably supported but due to the fact that the slots 22 are open, the back is supported for ready removal particularly to facilitate re-upholstering.

Various changes may be resorted to provided they fall within the spirit and scope of the invention.

I claim as my invention:—

1. In combination with posts having offset portions and displaceable trimming elements thereover and extending below the offset portions, a back for use with a seat, said back having bars fastened to the sides thereof, said bars having elongated slots, pivot members engaging said slots to permit pivotal and sliding movement of the back to a position alined with the seat to form a reposing structure, said bars extending above the adjacent portions of the upper edge of the said back and adjacent their upper ends having holes therethrough, and screws passing removably through said holes to engage the posts, to secure the back in a normally upright position, said bars above the posts and said screws being normally disposed under said offset portions and concealed by said trimming elements.

2. In combination with a post having an offset portion and a displaceable trimming element thereover and extending below the offset portion, a back for use with a seat, the back having a bar fastened to a side thereof, a pivot member engaging the back to permit movement thereof to a position alined with the seat to form a reposing structure, said bar extending above the adjacent portion of the upper edge of the said back, a fastening carried by said bar above said upper edge to engage said post to secure the back in a normally upright position, said bar and fastening above the post being under the offset portion and concealed by said trimming element.

In testimony whereof I affix my signature.

LEE C. BRAY.